United States Patent [19]

Osaki et al.

[11] Patent Number: 5,771,149

[45] Date of Patent: Jun. 23, 1998

[54] CAPACITOR DEVICE

[75] Inventors: Katsuhiro Osaki, Goutsu; Kenji Yamada, Matsue; Kazuo Ogawa, Hirakata, all of Japan

[73] Assignee: Matsushita Electric Industrial Co., Ltd., Kadoma, Japan

[21] Appl. No.: 807,860

[22] Filed: Feb. 26, 1997

[30] Foreign Application Priority Data

Mar. 1, 1996 [JP] Japan ................................. 8-044523

[51] Int. Cl.$^6$ .......................... H01G 4/228; H01G 4/236; H01G 4/005; H01G 2/20
[52] U.S. Cl. ..................... 361/306.1; 361/303; 361/307; 361/308.1; 361/310; 361/520; 361/538; 361/540; 429/163; 429/178
[58] Field of Search ...................................... 361/303–305, 361/306.1–306.3, 307, 308.1, 308.3, 310, 517, 520, 535, 538, 540; 429/34, 37, 163–164, 166–167, 170, 178

[56] References Cited

U.S. PATENT DOCUMENTS 4,617,609 10/1986 Utner et al. ............................ 361/310

Primary Examiner—Bot L. Ledynh
Attorney, Agent, or Firm—Panitch Schwarze Jacobs & Nadel, P.C.

[57] ABSTRACT

A fixing part having a room in which a metal attachment leg is inserted to attach a capacitor unit is disposed on an outside face of a case. An electrode connected to a terminal of a capacitor element is disposed in the fixing part, and a lock part to be engaged with the inserted metal attachment leg is disposed, whereby when the metal attachment leg is inserted into the fixing part, the electrode of the fixing part is electrically contacted to the metal attachment leg by elasticity.

10 Claims, 13 Drawing Sheets

CAPACITOR DEVICE

BACKGROUND OF THE INVENTION

The present invention relates to a capacitor device having an attachment leg which serves as a member for mounting a capacitor and a terminal for electrically connecting the capacitor.

The capacitor device of this type is widely used for noise suppression of an automobile, and its demand is increasing every year with the recent spread of car-electronics. Hereafter, description is made as to a conventional capacitor device used for the automobile with reference to FIG. 12 and FIG. 13. As shown in FIG. 12 and FIG. 13, an interior of a case 1 made of resin is divided into two rooms 9a and 9b, and there is a hole 1a on the bottom of the room 9b. An attachment leg 2 is inserted into the hole 1a so as to reach an opening part 9c. A wire 4 and a lead wire 5 are connected to electrode parts 3a and 3b of a capacitor element 3 placed in the case 1, respectively. The lead wire 5 is connected to a connection part 6 of the attachment leg 2 in the case 1, and after then, the connection part 6 and the attachment leg 2 are fixed by filling the case 1 with a filler resin 7. The size of the hole 1a is made slightly smaller than the size of the attachment leg 2, and is designed so that there is no gap between the hole 1 and attachment leg 2 when the attachment leg 2 is press-fitted into the hole 1a of the case 1.

When the capacitor device is mounted on the automobile, the wire 4 is connected to a circuit of the automobile. The attachment leg 2 connected to the electrode part 3b of the capacitor element 3 is fixed to the body of the automobile by a bolt or a screw through a fixing hole 2a, thereby configuring an electric circuit. A similar prior art to above is disclosed in the Japanese utility model Sho 63-5216, for example.

In the configuration of the above-mentioned conventional art, the attachment leg 2 is fixed by inserting it into the hole 1a of the case 1, connecting to the capacitor element 3, followed by filling with the filler resin 7. Therefore, there is the problem that the filler resin 7 leaks from the hole 1a of the case 1 and a defective occurs, and operation facility in assembly lowers in the case of an attachment leg of complicated shape. Although bolt-fitting has been the mainstream in installation of the capacitor device to the body, recently, there is a requirement to the method that an attachment leg is welded to the body and a component is fixed by only inserting it into the attachment leg in order to improve operation facility in assembly of the body. However, there is a problem that the above-mentioned conventional art cannot cope with the requirement, because the capacitor and the attachment leg are configured in one body.

The present invention is to solve the above-mentioned problems, and purposes to provide such a capacitor device that the filler resin does not leak from the case, the operation facility in assembly does not lower in a complicated attachment leg and the operation facility in installation to the body can be improved.

BRIEF SUMMARY OF THE INVENTION

In order to achieve these purposes, a capacitor device of the present invention comprises a capacitor unit and an attachment leg, and the capacitor unit has a fixing part on an outer face of a case, and the attachment leg is inserted into the fixing part and can be easily fixed. And an electrode plate connected to one electrode of a capacitor element at one end and extracted outward from the case at the other end is disposed in the above-mentioned fixing part on the outer face of the case.

The capacitor device of the present invention comprises a resin case having an opening at an upper part, a metal attachment leg to be attached to an outside face of the case for fixing the capacitor unit to an external member, a capacitor element inserted in the case so that terminals connected to respective electrodes of the capacitor element are led out of the upper opening of the case, and filler resin filled in the case. The case is provided with a fixing part having a room to insert the metal attachment leg on a side face of the case to which the metal attachment leg is attached, and an engaging part for engaging with the inserted metal attachment leg. One of the terminals of the capacitor element is formed into a plate-shape, and electrically contacts the metal attachment leg in the fixing part by elasticity.

The plate-shaped terminal of the capacitor element is led out in slanted state with respect to the upper face of the filler resin filled in the case.

The plate-shaped terminal of capacitor element is formed in a clip-shape for clipping an upper opening part on the side face of the case to which the metal attachment leg is attached.

The plate-shaped terminal of the capacitor element comprises an electrode connection part connected to the electrode of the capacitor element, a clipping part formed continuously from the electrode connection part and made so as to clip the upper opening edge of the side face of the case to which the metal attachment leg is attached, and an elastic part formed continuously from the clipping part, inserted into the room of the fixing part of the case and contacting electrically the metal attachment leg by elasticity. The lead-out part of the plate-shaped terminal is led out in the slanted state with respect to the upper face of the filler resin in the case at the clipping part of the plate-shaped terminal. The plate-shaped terminal is configured so as to clip the metal attachment leg at both faces. Furthermore, the plate-shaped terminal of the capacitor element is composed of a leaf spring material. A thickness of the leaf spring material is 0.5 mm and below.

The capacitor unit of the present invention is provided with a fixing part having a room with opening at respective ends on the side face of the case to which the metal attachment leg is to be attached. An elastic piece having elasticity is formed on the fixing part in one body, and a salient engaging part is disposed on an inner face of the elastic piece, and an aperture for engaging with the engaging part of the elastic piece is formed on the metal attachment leg to be inserted into the room of the fixing part.

In the above-mentioned configuration of the fixing part of the case, ribs for carrying out positional restriction in the direction of the thickness of the metal attachment leg to be inserted into the room of said fixing part are disposed on a face opposing to the elastic piece of the fixing part in parallel with the elastic piece.

By the above-mentioned configuration, connection between the electrode of the capacitor element and the attachment leg, which have been connected in the case in the prior art, can be realized by inserting the attachment leg into the fixing part. Since it is not necessary to form a hole for inserting the attachment leg on the case, there is no defect due to leakage of the resin, and therefore, an yield rate is improved. Since the insertion operation of the attachment leg can be carried out after a setting step of the capacitor element and a filling step of the filler resin, assembly operation is not influenced by the shape of the attachment leg. Furthermore, in the case of a welded attachment leg on the body of the automobile or the like, the attachment leg is not necessary for the capacitor device, and a production cost decreases, and furthermore in an assembly line, operation facility in installation to the body is improved because electrical connection between the attachment leg and the capacitor unit is completed by insertion of the attachment leg into the capacitor unit.

DETAILED DESCRIPTION OF THE INVENTION

[First embodiment]

Hereafter, a first embodiment of the present invention is described with reference to FIG. 1 to FIG. 6. A capacitor device of the first embodiment comprises a capacitor unit 10 and a metal attachment leg 12.

Figure 1:
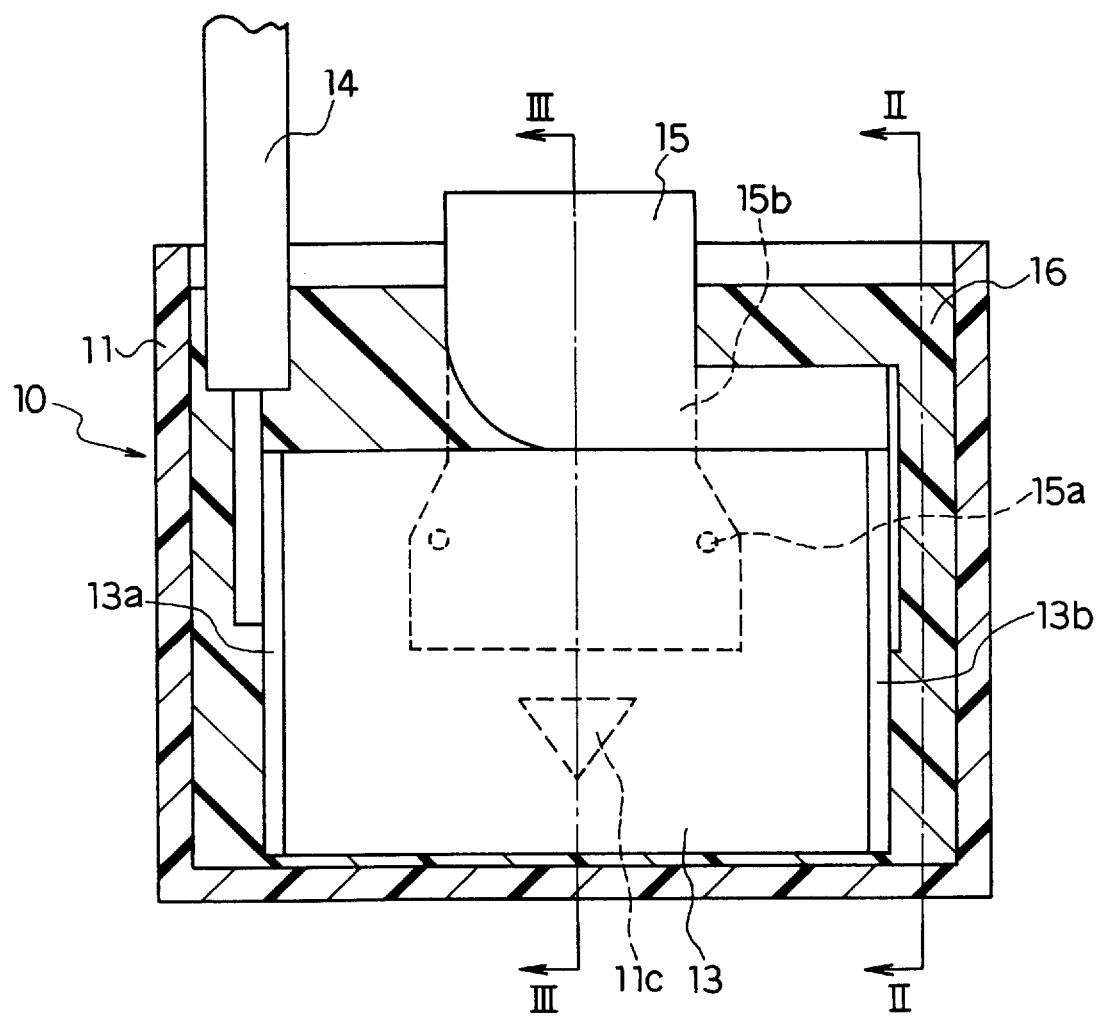
FIG. 1 is a cross-sectional front view of a capacitor unit in a first embodiment of the present invention.
Figure 2:
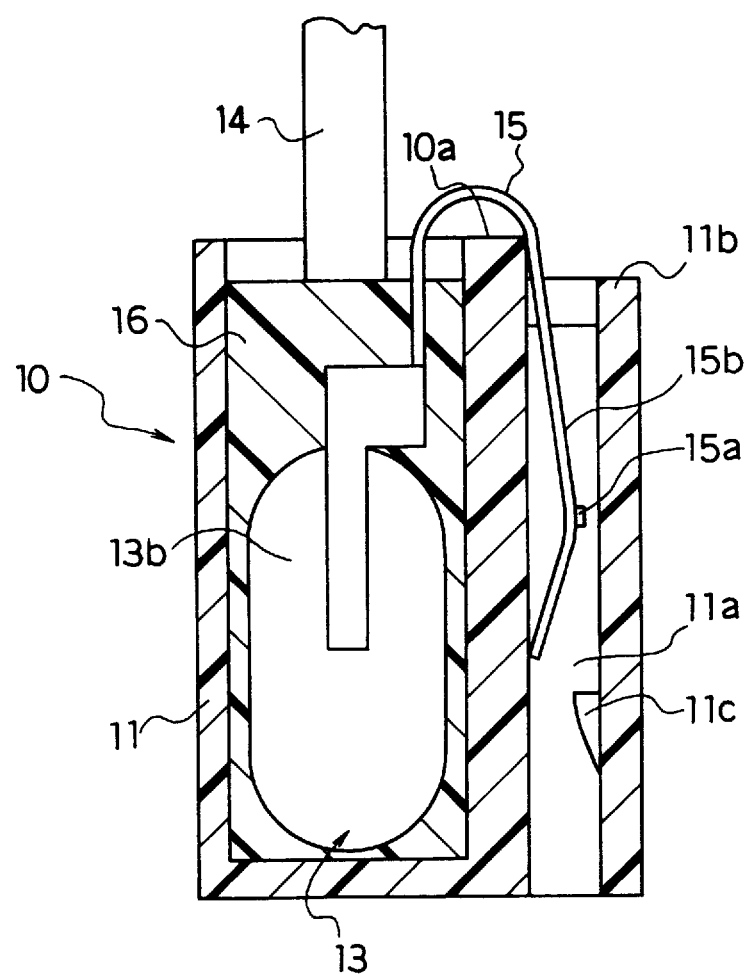
FIG. 2 is a II—II cross-section of the capacitor unit in FIG. 1.
Figure 4:
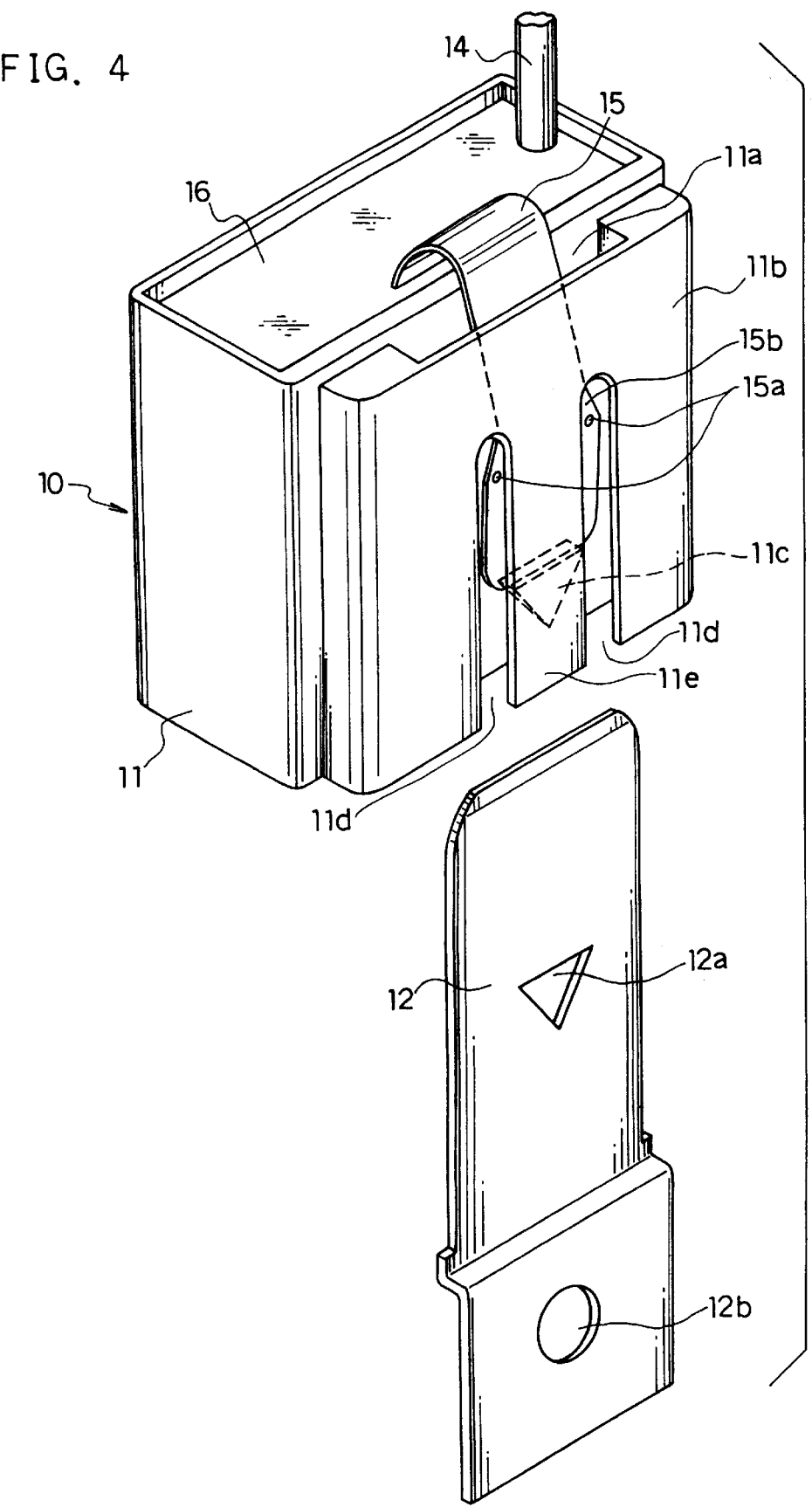
FIG. 4 is a perspective view of the capacitor unit and the attachment leg in the first embodiment.

FIG. 1 is a cross-sectional front view of the capacitor unit 10 in the first embodiment of the present invention, and FIG. 2 is a II—II cross section of FIG. 1. Referring to FIG. 1 and FIG. 2, a fixing part 11b having a slot-shaped room 11a in which a metal attachment leg 12 is inserted is disposed on one side face having the maximum area of a rectangular resinous case 11 having an opening at an upper part. The fixing part 11b, as shown in FIG. 4, comprises two slits 11d, and an elastic piece 11e is made to bend easily. A lock part 11c is disposed on the inner face of the elastic piece 11e.

A capacitor element 13 is inserted in the above-mentioned case 11. A terminal 14 composed of a wire and an electrode plate 15 as a terminal made of a leaf spring material are connected to electrodes 13a and 13b at ends of the capacitor element 13, respectively. The electrode plate 15, as shown in FIG. 2, is clip-shaped so as to clip an upper opening part 10a of the case 11, and an end part 15b thereof is folded down bow-shaped. Two projection parts 15a for engagement are disposed on the surface of the end part 15b. The end part 15b of the electrode plate 15 is led out of the upper opening of the case 11 and inserted in the room 11a so as to be placed in the room 11a of the fixing part 11b formed on the outside face of the case 11.

The case 11 is filled with a filler resin 16 so as to enclose and seal the capacitor element 13, the terminal 14 and a part of the electrode plate 15.

When the capacitor unit 10 is mounted on an automobile or the like machine, the metal attachment leg 12 shown in FIG. 4 is used. The metal attachment leg 12 has a hole 12b for fixing the metal attachment leg 12 on a body of the automobile and a triangular hole 12a which engages with the above-mentioned lock part 11c.

Figure 3:
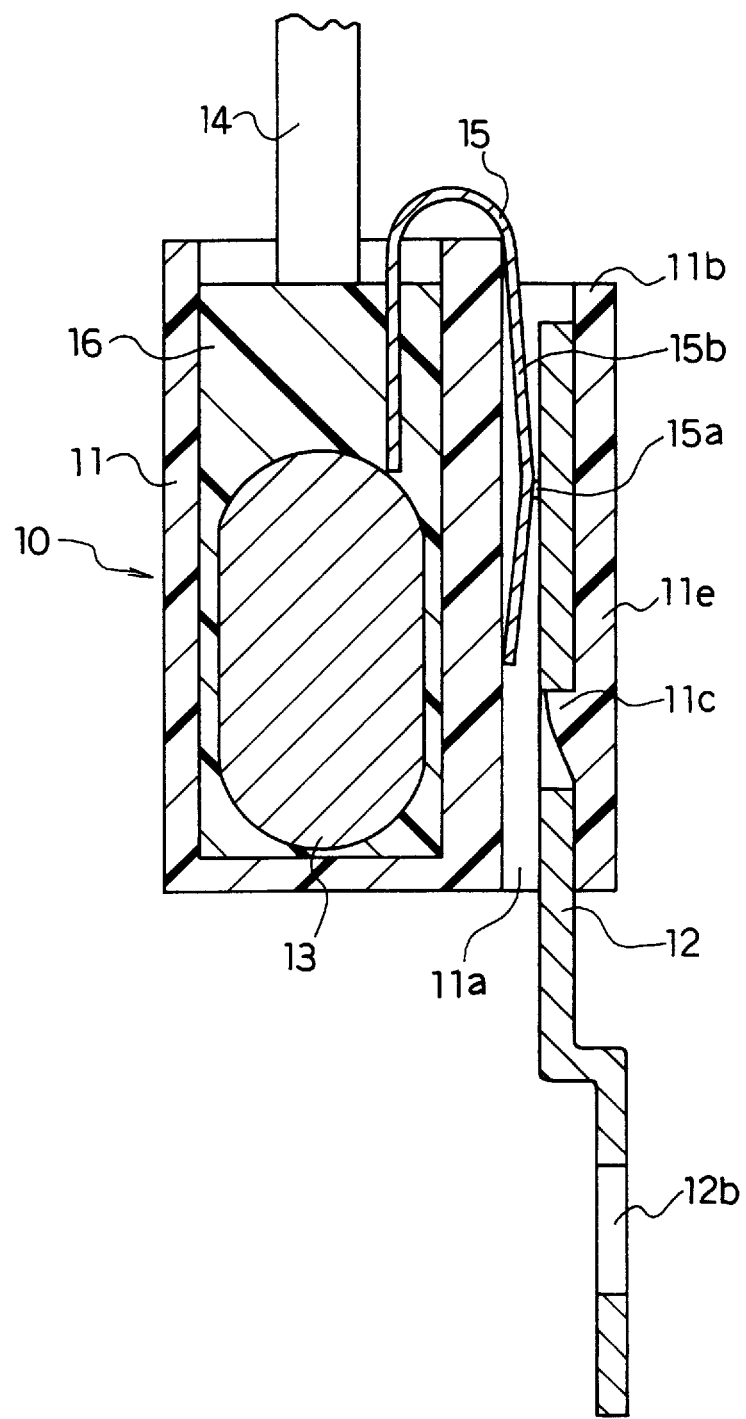
FIG. 3 is a III—III cross-section of the capacitor unit in FIG. 1, in the state that an attachment leg is inserted into a fixing part of a case.
Figure 5:
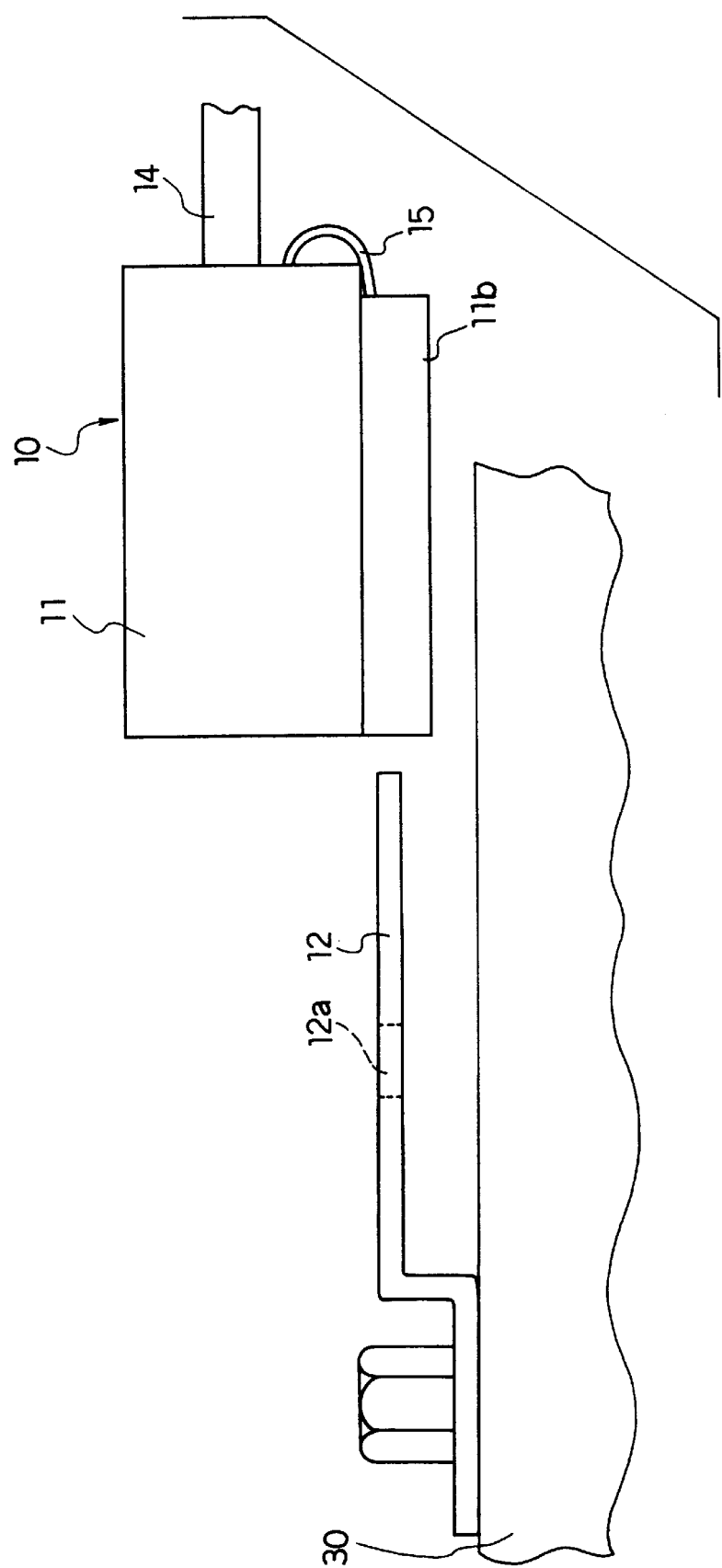
FIG. 5 is a side view of the capacitor unit and the attachment leg which are assembled to a body of an automobile.

As shown in FIG. 3 and FIG. 4, when the metal attachment leg 12 is inserted in the room 11a of the fixing part 11b formed on the case 11 in one body, the metal attachment leg 12 contacts electrically the projection parts 15a of the electrode plate 15 led out of the capacitor element 13 by elasticity. Furthermore, by elastically bending the elastic piece 11e, the triangular hole 12a of the metal attachment leg 12 engages with the lock part 11c of the fixing part 11a of the case 11, and the capacitor unit 10 is fixed. The terminal 14 of the capacitor unit 10 is connected to a circuit of the automobile, and the metal attachment leg 12 connected to the electrode plate 15 is fixed on a body 30 of the automobile by a bolt or a screw through the hole 12b for fixing as shown in FIG. 5, and thereby configuring an electric circuit.

As mentioned above, according to the present embodiment, a hole for inserting the metal attachment leg 12 is not needed to be on the bottom of the case 11, and therefore a filler resin does not leak. Furthermore, the fixing part 11b of the metal attachment leg 12 is formed in one body on the outer face of the case 11, and the electrode plate 15 led out of one electrode 13b of the capacitor element 13 is arranged in the fixing part 11b of the attachment leg 12, whereby the electrode of the capacitor element 13 can be connected to the metal attachment leg 12 by inserting the metal attachment leg 12 into the fixing part 11b. Moreover, as shown in FIG. 5, in the case that the metal attachment leg 12 is fixed in advance on the body of the automobile, it is unnecessary to attach the metal attachment leg to the capacitor unit. Consequently the cost as a component is reduced, and a weight is lightened. In mounting to the body of the automobile, bolt fastening work is not needed, and operation facility can be improved.

Figure 6:
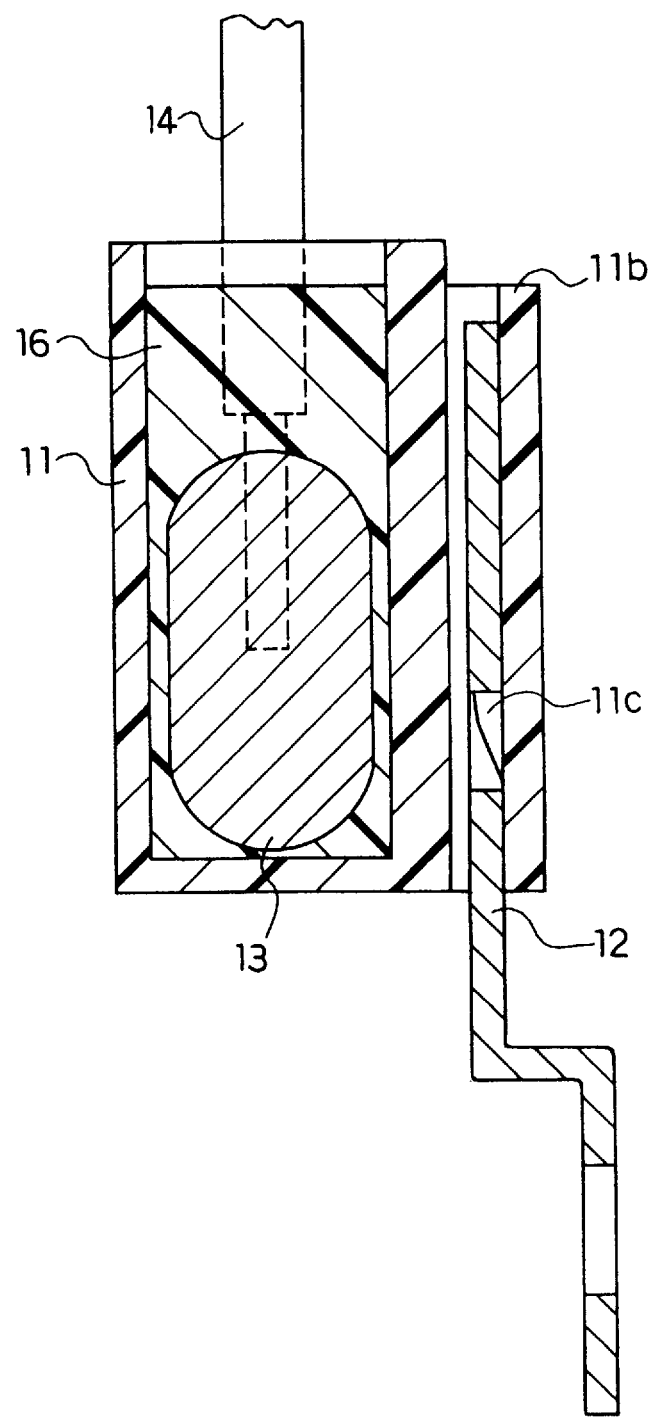
FIG. 6 is a cross-sectional side view of a capacitor unit of which the attachment leg is inserted into a fixing part having no electrode plate.

Incidentally, a concrete embodiment of the present invention has been described above, but it can be changed in the scope of the invention without restriction to the above-mentioned embodiment. According to the present embodiment, although the metal attachment leg 12 serves as the terminal plate of the electrode, as shown in FIG. 6, the metal attachment leg can be used for fixing the capacitor unit. Furthermore, the present invention is applicable to other than the automobile.

[Second embodiment]

Hereafter, a second embodiment of the present invention is described with reference to FIG. 7 to FIG. 11B.

Figure 7:
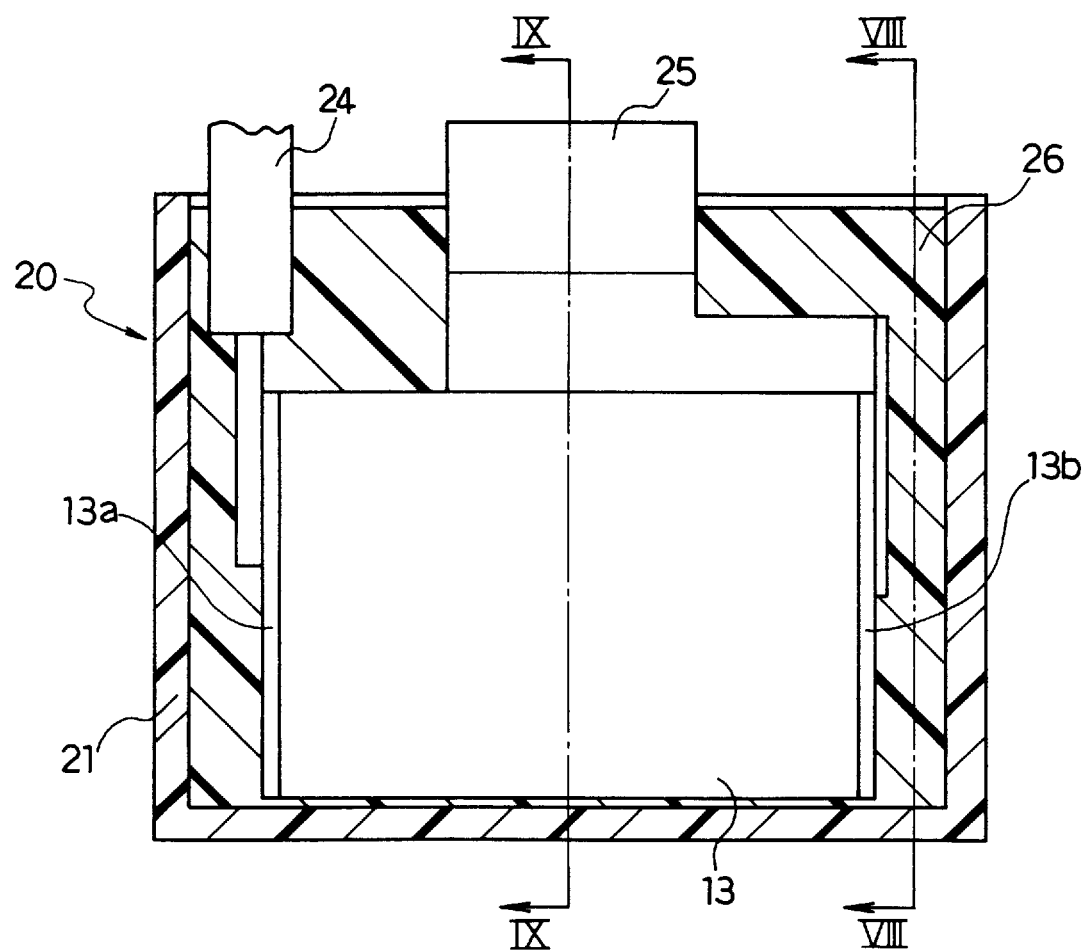
FIG. 7 is a cross-sectional front view of the capacitor unit in a second embodiment of the present invention.
Figure 8:
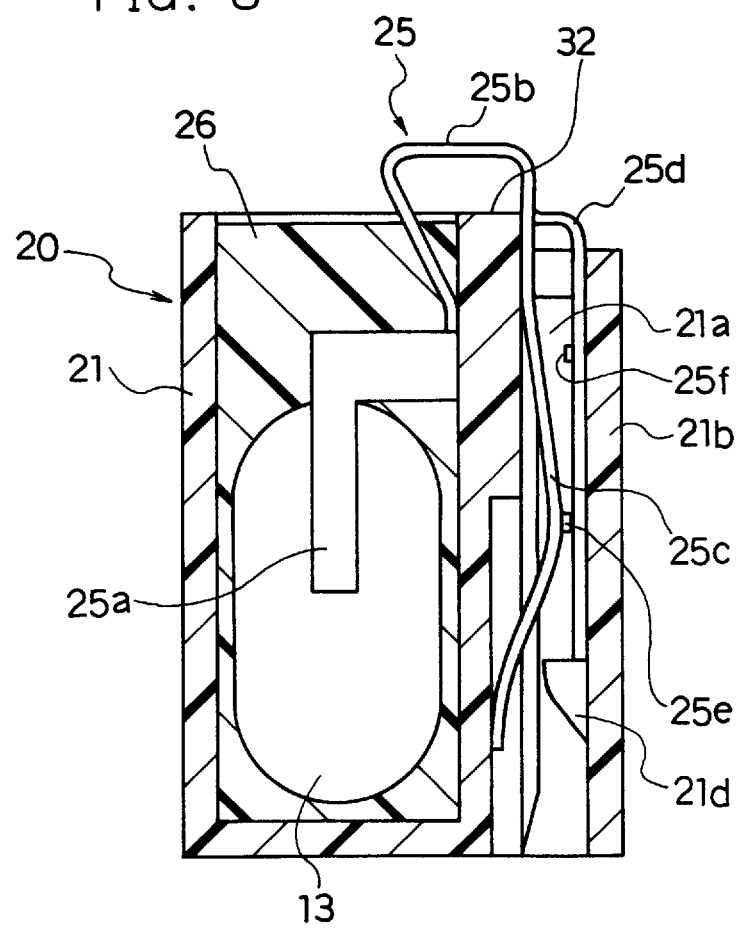
FIG. 8 is a VIII—VIII cross-section of the capacitor unit in FIG. 7.
Figure 9:
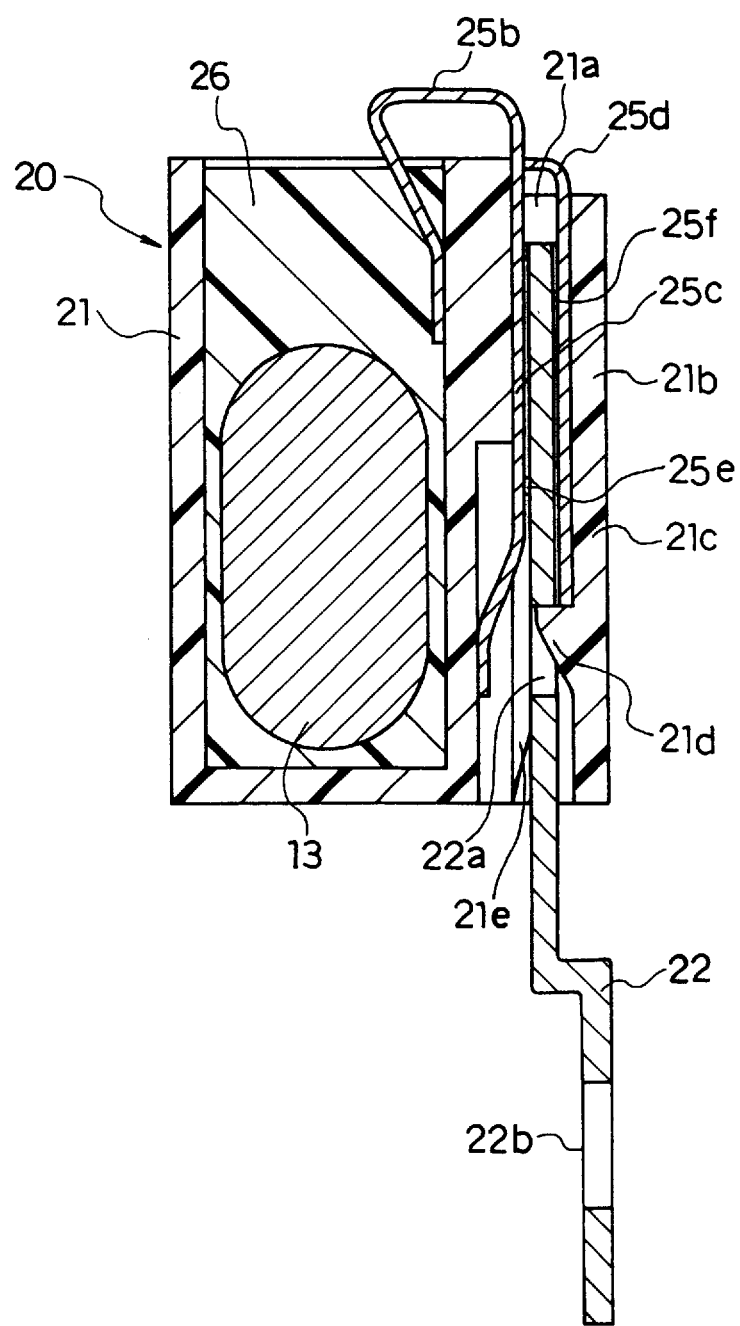
FIG. 9 is a IX—IX cross-section of the capacitor unit in FIG. 7, in the state that the attachment leg is inserted in the fixing part.

FIG. 7, FIG. 8 and FIG. 9 are cross-sectional views of the capacitor unit in the second embodiment of the present invention.

Figure 10:
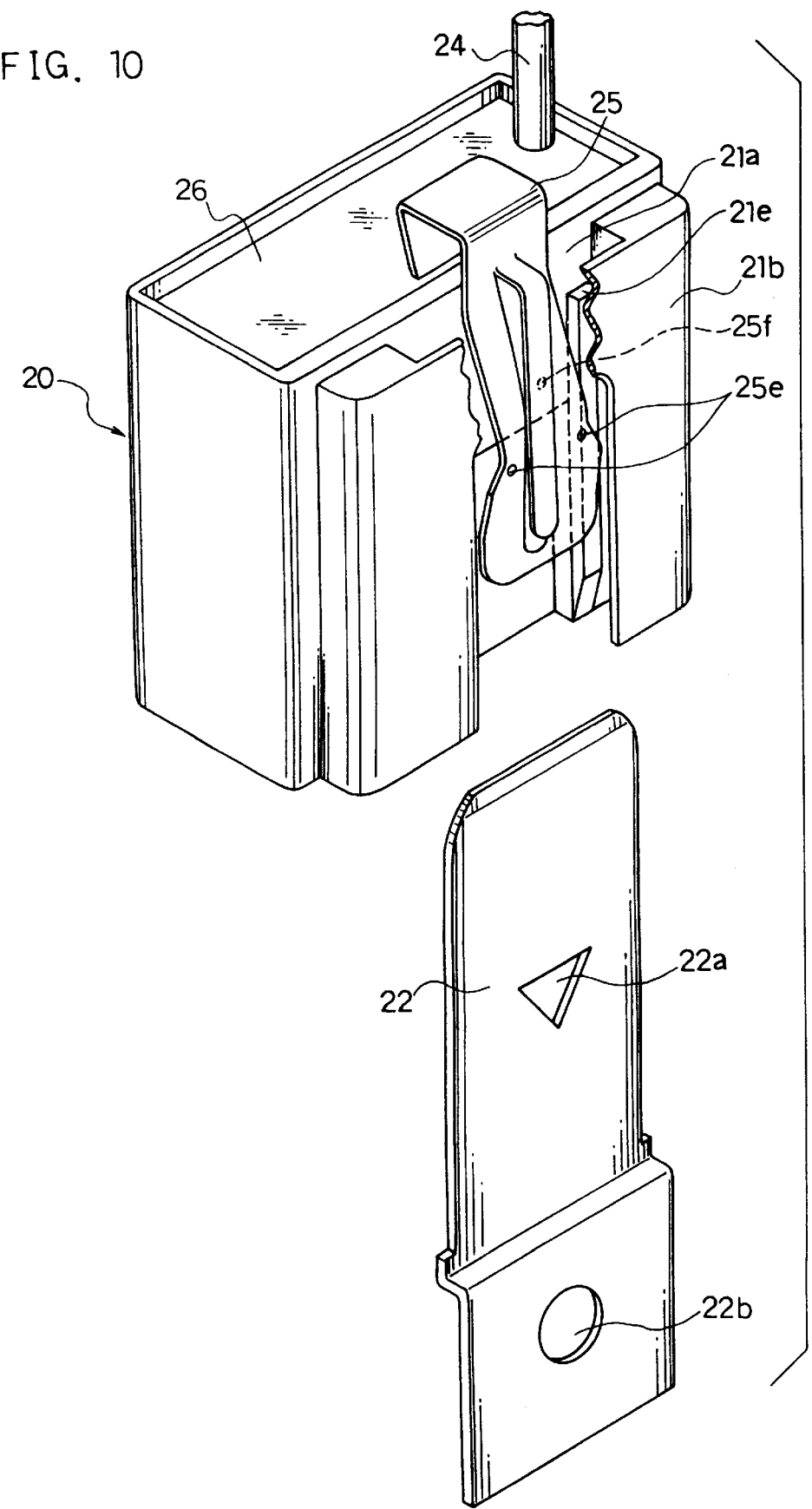
FIG. 10 is a perspective view of the capacitor unit and the attachment leg.
Figure 11A:
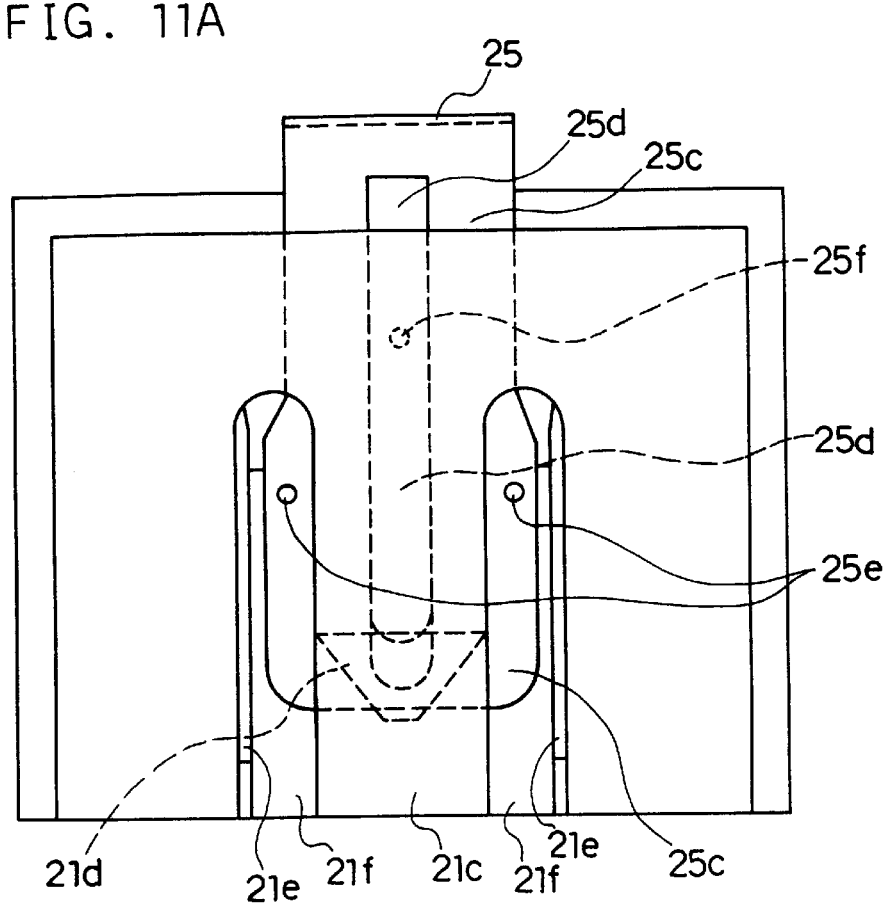
FIG. 11A is a rear view of the capacitor unit of the second embodiment.
Figure 11B:
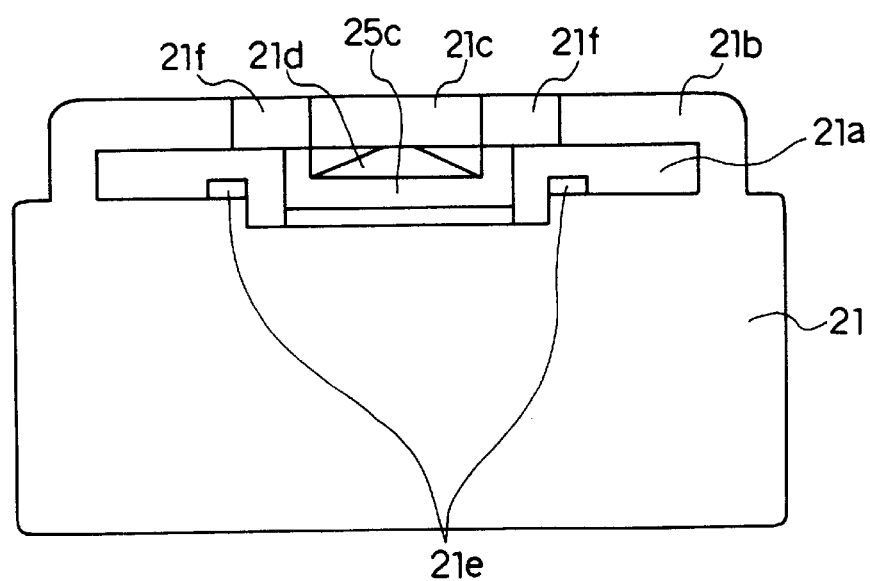
FIG. 11B is a bottom view of the capacitor unit of the second embodiment.
Figure 12:
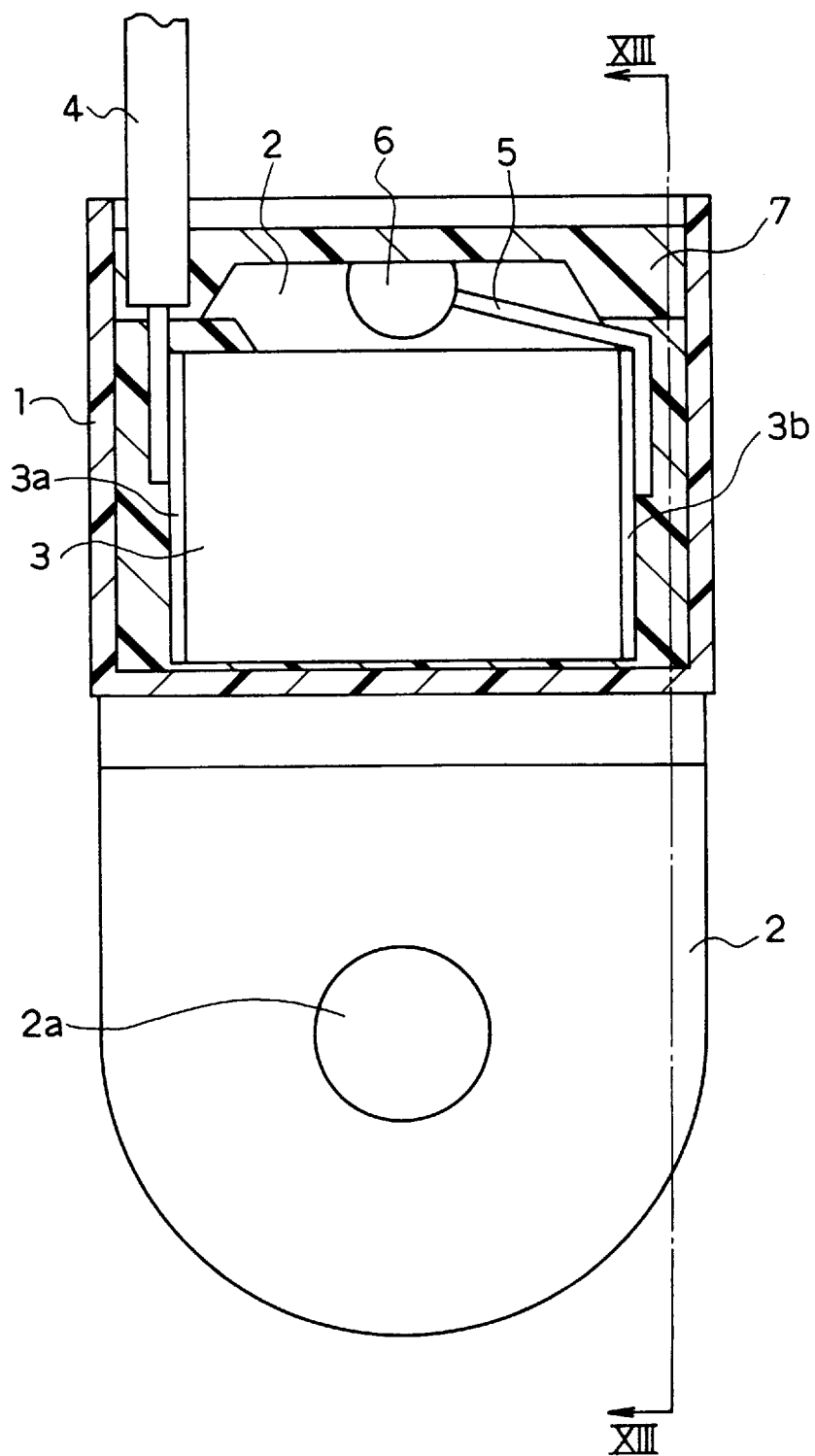
FIG. 12 is the cross-sectional front view of the conventional capacitor device.
Figure 13:
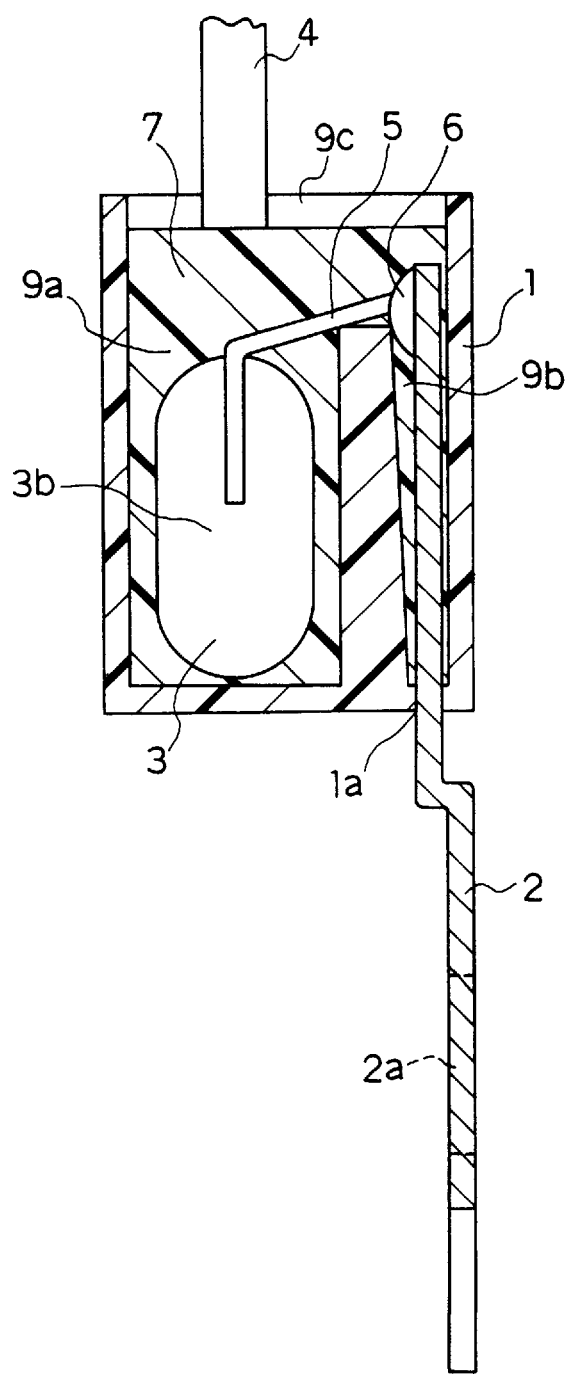
FIG. 13 is the cross-sectional side view of the conventional capacitor device.

Referring to FIG. 7 and FIG. 8, a fixing part 21b having a room 21a open at an upper part and a lower part is disposed on the outside face of the maximum area of a rectangular resinous case 21 having an opening at an upper part. As shown in FIG. 11A and FIG. 11B, two slits 21f are formed on the fixing part 21b, and thereby an elastic piece 21c having elasticity is formed by monobloc molding of resin. A projection-shaped engagement part 21d is disposed on the inside face of the elastic piece 21c. As shown in FIG. 10, a hole 22a for engaging with the engagement part 21d of the elastic piece 21c is formed on a metal attachment leg 22 which is inserted into the room 21a of the fixing part 21b when the capacitor unit 20 is installed in an automobile, for example.

Moreover, in the configuration of the above-mentioned fixing part 21b, two ribs 21e are disposed on an opposed face to the elastic piece 21c in parallel to the elastic piece 21c. The ribs 21e restrict a position of the metal attachment leg 22 in the thickness direction, when the metal attachment leg 22 is inserted into the room 21a.

In FIG. 7, a terminal 24 comprising a wire and an electrode plate 25 as a plate-shaped terminal are connected electrodes 13a and 13b of the capacitor element 13 placed in the case 21, respectively.

As shown in FIG. 8, the electrode plate 25 of the capacitor element 13 is composed of a leaf spring member having a thickness of 0.5 mm and below, and configured in a clip-shape so as to clip an upper opening edge 32 of the case 21 at the side face to which the metal attachment leg 22 is attached. The electrode plate 25 comprises an electrode connection part 25a to be connected to the electrode 13b of the capacitor element 13, a clip part 25b which is continuously formed from the electrode connection part 25a and arranged so as to clip the upper opening edge 32 of the case 21, and elastic parts 25c and 25d which are continuously formed from the clip part 25b and inserted into the room 21a of the fixing part 21b of the case 21.

As shown in FIG. 8 and FIG. 9, the elastic parts 25c and 25d which are the end portions of the electrode plate 25 are arranged in substantially parallel and the same direction with each other so as to clip both faces of the metal attachment leg 22 which is inserted into the room 21a of the fixing part 21b. The elastic part 25c is formed in bow-shape, and two projections 25e are disposed on the surface of the elastic part 25c so as to protrude to the side of the elastic part 25d. One projection 25f is disposed on the elastic part 25d so as to protrude to the side of the elastic part 25c.

The case 21 is filled with a filler resin 26 so as to enclose the capacitor element 13, the terminal 24 and a part of the electrode plate 25. Moreover, the clip part 25b of the electrode 25 is led out of the filler resin 26 in the state oblique to the upper surface of the filler resin filled in the case 21. As shown in FIG. 9, when the metal attachment leg 22 is inserted into the fixing part 21b formed by monobloc molding with the case 21, the metal attachment leg 22 is inserted between the elastic parts 25c and 25d of the electrode 25 led out of the capacitor element 13, and electrically contacts the projections 25e and 25f by elasticity.

The metal attachment leg 22 has a hole 22a, and when the metal attachment leg 22 is inserted into the fixing part 21b, by elastically bending the elastic piece 21c, the engagement part 21d of the elastic piece 21c of the case 21 engages with the hole 22a, and the metal attachment leg 22 is secured. When the capacitor unit is mounted to an automobile, the terminal 24 is connected to a circuit of the automobile, and the metal attachment leg 22 connected to the electrode plate 25 of the capacitor element 13 is fixed to a body of the automobile through a bolt or a screw, and an electric circuit is configured.

As mentioned above, according to the present embodiment, the elastic piece 21c having elasticity and the projection-shaped engagement part 21d are disposed on the fixing part 21b of the case 21, and the hole 22a for engaging with the above-mentioned engagement part 21d is disposed on the metal attachment leg 22, whereby the metal attachment leg 22 can be easily fixed to the case 21 by only inserting the metal attachment leg 22 into the fixing part 21b.

Moreover, since the ribs 21e are disposed on the surface of the fixing part 21b opposing to the elastic piece 21c, the position of the metal attachment leg 22 is restricted in the thickness direction, and the metal attachment leg 22 can be stably fixed whether the electrode plate 25 is present or absent.

Furthermore, the electrode plate 25 is configured so as to clip the metal attachment leg 22 at both faces between the bow-shaped elastic part 25c and the elastic part 25d, whereby, in the electrical connection between the metal attachment leg 22 and the electrode plate 25, favorable electrical connection state can be held even if external vibration is given. In particular, in the capacitor device used for a machine such as an automobile to which the external vibration is liable to be given, reliability in electrical connection state can be held.

Furthermore, the clip part 25b of the electrode plate 25 is led out in the slanted state with respect to the upper surface of the filler resin 26 so that the clip part 25b is spaced apart from the inner wall of the case 21. Therefore, when the case 21 is filled with the filler resin 26, it is prevented that the filler resin leaks outside by passing across a wall face of the case 21 and the clip part 25b.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A capacitor device comprising:
   a resinous case of a capacitor unit having an opening at an upper part,
   a metal attachment leg to be attached on an outside face of said case for fixing said capacitor unit to an external member,
   a capacitor element inserted in said case so that terminals connected to respective electrodes of said capacitor element are led out of said upper opening of said case, and
   filler resin for filling said case, and
   said case being provided with a fixing part having a room to be inserted with said metal attachment leg on a side face of said case to which said metal attachment leg is attached, and an engaging part for engaging with said inserted metal attachment leg, and
   one of said terminals of said capacitor element being formed into a plate-shape, and electrically contacting said metal attachment leg in said fixing part by elasticity.

2. A capacitor device in accordance with claim 1, wherein said plate-shaped terminal of said capacitor element is led out in the state slanted with respect to the upper face of said filler resin in said case.

3. A capacitor device in accordance with claim 1, wherein said plate-shaped terminal of said capacitor element is formed in a clip-shape for clipping an upper opening edge of the side face of said case to which said metal attachment leg is attached.

4. A capacitor device in accordance with claim 1, wherein said plate-shaped terminal of said capacitor element comprises:
- an electrode connection part connected to said electrode of said capacitor element,
- a clipping part formed continuously from said electrode connection part and made so as to clip an upper opening edge of the side face of said case to which said metal attachment leg is attached, and
- an elastic part formed continuously from said clipping part, inserted into said room of said fixing part of said case, and contacting electrically said metal attachment leg by elasticity, and is led out in the state slanted with respect to the upper face of said filler resin in said case at said clipping part of said plate-shaped terminal.

5. A capacitor device in accordance with claim 4, wherein said elastic part of said plate-shaped terminal is configured so as to clip said metal attachment leg at both faces.

6. A capacitor device in accordance with claim 1, wherein said plate-shaped terminal of said capacitor element is composed of a leaf spring material.

7. A capacitor device in accordance with claim 6, wherein a thickness of said leaf spring material is 0.5 mm and below.

8. A capacitor device in accordance with claim 1, wherein said fixing part comprising a room having openings at both ends is disposed on the side face of said case to which the metal attachment leg is attached, and
an elastic piece having elasticity is formed in said fixing part in one body, and salient engaging part is disposed on an inner face of said elastic piece, and an aperture for engaging with said engaging part of said elastic piece is disposed on said metal attachment leg which is inserted into said room of said fixing part.

9. A capacitor device in accordance with claim 1, wherein ribs for carrying out positional restriction in the direction of thickness of said metal attachment leg to be inserted into said room of said fixing part are disposed on a face opposing to said elastic piece of said fixing part in parallel with said elastic piece.

10. A capacitor device in accordance with claim 1, wherein said plate shaped terminal is configured so as to clip said metal attachment leg at both faces.

* * * * *